US006701307B2

(12) United States Patent
Himmelstein et al.

(10) Patent No.: US 6,701,307 B2
(45) Date of Patent: *Mar. 2, 2004

(54) METHOD AND APPARATUS OF EXPANDING WEB SEARCHING CAPABILITIES

(75) Inventors: Martin W. Himmelstein, Hanover, NH (US); Dwight Aspinwall, Lebanon, NH (US); Gerald F. Halstead, Lebanon, NH (US); Charles Goldensher, Lebanon, NH (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,746

(22) Filed: Oct. 28, 1998

(65) Prior Publication Data

US 2001/0011270 A1 Aug. 2, 2001

(51) Int. Cl.[7] .............................................. G06F 17/30
(52) U.S. Cl. ........................ 707/3; 707/102; 707/104.1; 701/207
(58) Field of Search .............................. 707/3–5, 9–10, 707/100–104.1, 104; 358/400; 701/200, 206–208; 382/190, 201

(56) References Cited

U.S. PATENT DOCUMENTS

| 5,532,838 | A | * | 7/1996 | Barbari .................. 358/400 |
| 5,630,072 | A | * | 5/1997 | Dobbins .................... 705/22 |
| 5,682,525 | A | * | 10/1997 | Bouve et al. ............. 395/615 |
| 5,712,712 | A | * | 1/1998 | Sayward .................. 358/468 |
| 5,805,810 | A | * | 9/1998 | Maxwell ................... 709/206 |
| 5,835,236 | A | * | 11/1998 | Barbari .................. 358/442 |
| 5,991,739 | A | * | 11/1999 | Cupps et al. .............. 705/26 |
| 6,101,496 | A | * | 8/2000 | Esposito ..................... 707/6 |
| 6,157,924 | A | * | 12/2000 | Austin ..................... 707/10 |
| 6,363,392 | B1 | * | 3/2002 | Halstead et al. ......... 707/102 |
| 6,397,219 | B2 | * | 5/2002 | Mills ....................... 707/10 |

OTHER PUBLICATIONS http://www.plantall.com/registration/help/agrehelp.asp, Planet All Help Jun. 29, 1998, pp. (10).

* cited by examiner

Primary Examiner—Shahid Alam
Assistant Examiner—Jean Bolte Fleurantin
(74) Attorney, Agent, or Firm—King & Spalding LLP

(57) ABSTRACT

A method and apparatus for improving searching capability on a Web. At index time, a Web page is spidered and the text and metatags returned to a processor. The processor extracts spatial information from the text and metatags. A geocode is generated for the spatial information. The geocode is then indexed along with the remaining contents of the page. A subsequent query during query time can search for entries based on proximity to a known location using the indexed geocode.

39 Claims, 4 Drawing Sheets

X = 0 0 0 1 1 0 1 1 0 1 0 1 1 0 0 0
Y = 1 0 1 0 0 1 0 0 0 0 0 1 0 0 0 0
I = 01000110100110100010001110000000
Q 1 0 1 2 2 1 2 2 0 2 0 3 2 0 0 0

METHOD AND APPARATUS OF EXPANDING WEB SEARCHING CAPABILITIES

FIELD OF THE INVENTION

The present invention relates to the field of free text searching of documents; more specifically, the present invention relates to performing free text searches using spatial information obtained from documents, such as, for example, but not limited to, a web page.

BACKGROUND OF THE INVENTION

Several search engines exist for searching for documents, such as Web pages, on the World Wide Web (hereinafter "the Web"). These search engines typically operate by performing a free text search in which the search engines locate Web pages based on the keywords or terms they contain. Prior to any search, however, indexing is performed on Web pages to create an index which is compared against the keywords or terms during searching. The search engines employ software routines which spider the Web and obtain relevant information for indexing each Web page. Typically, the spider takes a page and pulls all of the words off the page, as well as any existing metatags, and assimilates it into a large database index. This indexing permits searching of the Web pages that have been spidered based on the content of those pages.

Inasmuch as pages on the Web are constantly changing, being added, deleted, or otherwise amended, it is a nontrivial task to maintain an index for each Web page that is as current as possible and dynamically expanding. One limitation of the spiders is that they are unable to spider dynamic pages. Dynamic pages are those pages that, for example, are returned responsive to a query such as yellow pages and things of that nature. Accordingly, most search engines permit literal text searching using boolean operators of only static indexed pages.

Unfortunately, search engines do not currently have any context regarding the relevant geography of these pages. For example, the spiders can not identify a location of the proprietor of a particular Web site, even if information such as an address is explicitly available on the page. While it is, of course, possible to use address information as a search term in a free, or full, text search, such address information may not be available (particularly for an individual not familiar with the geographic, or spatial, location), may not be in the index for the page or the location being sought by the search, and/or the search may not produce the desired results. For example, if an individual desires to search for hotels within a 20 mile radius of a particular city, the user may perform a free text search using search terms that include the name of the city and other terms describing a hotel. The results of such a search may include several Web pages for hotels in that city. However, such a search may miss many hotels that are located in a different city but are within the 20 mile radius because the city name used in the search was not on the Web page. An individual unfamiliar with the geographic area may not be able to specify the other cities within the radius, and thus any search they performed would not provide them with the results they desire. Even if a user is intimately familiar with a specific geographic area, explicitly listing all communities within the 20 mile radius is impractical.

In view of the foregoing, it is desirable to be able to perform free text searching using spatial information to facilitate proximity searching.

SUMMARY OF THE INVENTION

A method and apparatus for improving searching capability is disclosed. In one embodiment, a spatial datum is extracted from a document. The spatial datum undergoes geocoding. The result of the geocoding may then be used for searching.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
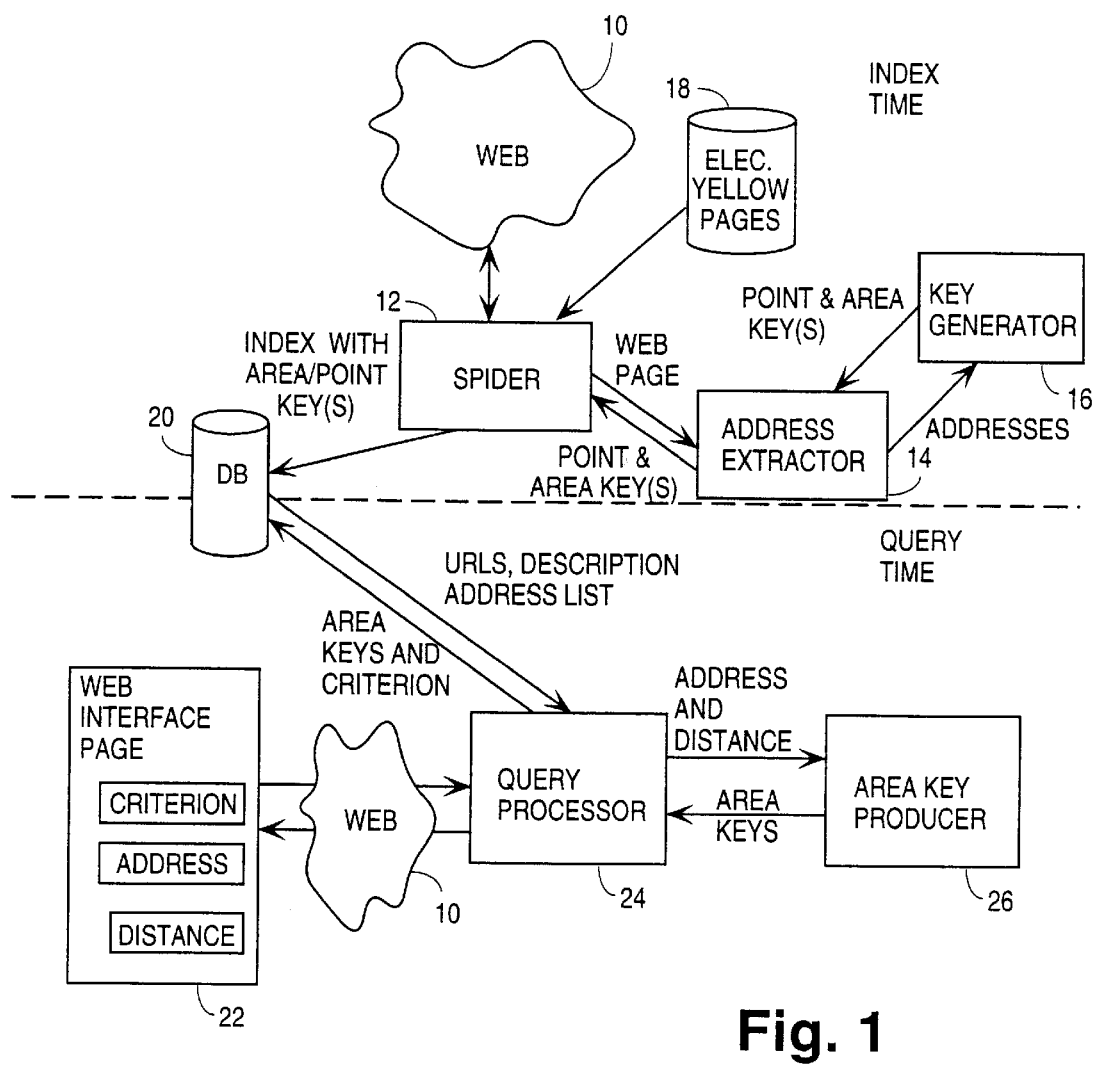
FIG. 1 is a block diagram of one embodiment of a system.

A method and apparatus for expanding searching capabilities for networked information is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required processing. The required structure for a variety of these machines will appear from the description below. In addition, the present invention is not described with reference to any particular programming language. It will be appreciated that a variety of programming languages may be used to implement the teachings of the invention as described herein.

Although all or some of the operations may be peripheral by software assembly on a computer system or specialized apparatus, some or all of these operations may be performed by digital logic and/or circuitry, an integrated circuit (e.g., ASIC) or other semiconductor substrate.

Overview

To improve searching of documents that may be accessible through an interconnected network environment such as the Web or through a database or storage area, searchable information may be generated by extracting spatial datum, such as address information (e.g., postal code, zip code, street number and name, city, state, area code, telephone number or other information indicative of an address, etc.) from a document and geocoding that spatial datum. The document may comprise, for example, but not limited to, a Web page (e.g., html document), resource, or any text-based file or a file with a textual component: documents comprised of, or which can be converted to, text, such as, for example, Microsoft Office documents, electronic mail messages, pdf files, postscript files, spreadsheets.

In one embodiment, this extraction of spatial datum may be performed when spidering the document. Spidering refers to automatic retrieval of documents from the web. The extraction of spatial data may occur after this process, or it can be linked to it. The spatial datum may be identified in the document by a tag, thereby facilitating the extraction process.

In one embodiment, when geocoding the extracted spatial datum, a pair of coordinates corresponding to the spatial datum is generated. The coordinates may comprise the latitude and longitude corresponding to the location specified by the spatial datum. A key that may be searched is generated from the coordinates. In one embodiment, a point key (or full resolution quad key) is generated from the coordinates. Generating the point key may comprise interleaving bits of an N-bit binary number representing the latitude with bits of an N-bit number representing the longitude and converting adjacent pairs of bits to a number.

The geocoded spatial datum may be indexed alone or along with other information to permit spatial searching of the document. In this manner, a spatial search may be performed when free text searching.

When searching, an individual specifies a spatial origin and a distance. In one embodiment, the spatial origin enables a point key to be generated. Using the point key and the distance, one or more area keys may be generated that intersect a predetermined region (e.g., circle) defined by the distance around the point key. The area keys are used to search a database for text matches that occur between the area keys and point keys stored in indices. As a result of the search, resource locators may be returned for a set of Web pages satisfying a criterion and containing an address within the predetermined region.

FIG. 1 is a block diagram of a system that allows setting up and searching of information resources, such as databases. The system may comprise a computer system. The computer system may comprise one or more servers, each with one or more processors executing software to perform functions described herein and each with access to one or more memories (e.g., databases).

Logically, the operation of the system may be divided into two time periods: index time and query time.

Index Time Operation

During index time, a spider 12 spiders web 10. The spider 12 accesses Web pages or other document resources and extracts any text and metatags. Spider 12 sends the text and metatags to address extractor 14.

Address extractor 14 searches through the text and metatags for an indication of spatial information. Such spatial information may include addresses or partial addresses. In an alternative embodiment, the spatial information may be geographical indicators or man-made objects or structures. In one embodiment, address extractor 14 searches for a particular tag that identifies the presence of spatial information. Address extractor 14 provides the spatial information to textual key generator 16.

Key generator 16 generates a key corresponding to the spatial information that has a proximate relation to other nearby spatial locations. The key may comprise any grouping of characters, numbers and/or symbols. In one embodiment, the key may be a textual key. In another embodiment, the key is an numeric key. The key may be an ASCII key. Generation of the key is discussed further below. Key generator 16 returns the key to address extractor 14 and then to the spider 12. In one embodiment, the key may be returned directly to spider 12.

Spider 12 includes the key in the index, along with other indexed terms and metatags. The index is stored in a database 20. Database 20 may comprise any storage structure capable of searching, indexing and retrieval. In one embodiment, database 20 is an inverted file structure. Database 20 may comprise one or more memories. In one embodiment, database 20 comprises a relational database.

Spider 12, address extractor 14, and/or key generator 16 may comprise software which runs on a general purpose or dedicated computer system, server or machine, or may comprise dedicated hardware or a combination of both.

Address Extraction

In one embodiment, address extractor 14 extracts addresses or address information using a program that locates addresses in documents. The following describes the operation of one such program. Such programming may be implemented in hardwired logic to perform the same, if not identical functionality. Other address extraction implementations may be used. Note that the following address extraction process assumes that the start and the end of a document can be determined, although it is immaterial to the operation of address extractor 14.

For each document in a given set of documents for which it is desired to find address information, the following processing operations are performed. The process is based on locating a clearly recognizable anchor (e.g., postal code, etc.) and examining text on both sides of that anchor to ascertain other portions of the address. It should be noted that although the process is described below with reference to a postal code, any other anchor may be used instead. In one embodiment, a zip code may be used as the anchor.

The process begins by first translating formatting tags into a simpler set of characters. This is an optional operation. These formatting tags are specific patterns that occur in the document and may be translated to a new set of output patterns. The purpose of this translation is to normalize the set of tokens and delimiters that address extractor 14 needs to recognize. For example, HTML uses specific formatting tags to direct the appearance of text or formatted pages. Translating the wide variety of formatting tags into a smaller set of modified tags or characters significantly reduces the coding complexity and execution overhead of address extractor 14.

Next, the address extraction locates a postal code in the document. Address extractor 14 scans the document for a token that looks like a postal code. Any such tokens identified are referred to herein as a potential postal code. A potential postal code is delimited by some set of characters deemed to represent a boundary between adjacent tokens. This set of characters may vary.

For each potential postal code, address extractor 14 records both the position in the document adjacent to and after the end of the potential postal code and the position in the document adjacent to and before the start of the potential postal code.

Whenever a potential postal code is located (or after all potential postal codes in the document have been located) for a string of a certain number of characters adjacent and to the left of the start of the potential postal code, address extractor 14 splits the characters in the string into a set of tokens and delimiters between the tokens.

After locating a postal code, address extractor 14 locates a state. In one embodiment, address extractor 14 determines whether the token or tokens adjacent and to the left of the potential postal code represent a state. In one embodiment, to perform this function, address extractor 14 uses an auxiliary table to compare the parsed token to a set of tokens that either represent a state name or a portion of a state name. If a token is a portion of state name, address extractor 14 examines the previous token to determine whether the pair of tokens taken together represent a valid state name. Based on the delimiter between two partial state name tokens, address extractor 14 may determine that the two tokens probably do not represent an integral unit that represents a state name. The set of delimiters so defined may be variable, and can be empty.

In one embodiment, once a potential state name has been identified, address extractor 14 may determine whether the potential state and potential postal code comprise a valid state and zip code combination. In one embodiment, address extractor 14 uses an auxiliary table to perform this check. If the combination is valid, there is a high degree of certainty that the portion of the document being examined represents at least a partial address.

Based on a set of conditions, address extractor 14 sets a confidence factor to a value that indicates the likelihood that the assembled token or tokens represent a state name. In one embodiment, the conditions can include, for example, whether the potential zip code and potential state tokens comprise a valid combination and what the delimiters before and after the potential state tokens are.

Note that the use of a confidence factor may not be necessary; however, the confidence factor may give greater certainty to the search results that are obtained from search, particularly where address extractor 14 finds multiple potential postal codes in a document and a determination must be made as to which of the potential postal codes is part of the address (or addresses) that will be extracted from the document.

In one embodiment, to determine a city name, address extractor 14 examines the tokens and delimiters that precede the state name to find a boundary condition that likely indicates a set of tokens representing a city name has been found. One example set of boundary conditions might include:

1. the presence of a delimiter, such as a comma, that separates one or more tokens from preceding text.
2. the presence of a token that is very likely not part of a city name, such as a number, or the token "Street" (or other similarly descriptive token). An auxiliary table may be used to identify the set of tokens explicitly excluded from inclusion as part of a city name.
3. Some maximal number of tokens. City names are rarely composed of more than three words, and in the absence of a stronger boundary condition, it might be necessary to choose some maximum number of tokens to represent the city.
4. Optionally, potential city name tokens can be checked against an auxiliary city name to state/postal code translation table to check the accuracy of the extracted city name. The use of an auxiliary table is particularly useful in the absence of a starting delimiter. For example, it is possible that the last token of the street address could also be the first token of the city name. A token such as "North" could be a postdirectional that appears at the end of the street address, or the beginning of a city name, such as "North Conway."

One embodiment of the process performed by address extractor 14 to locate a street address is as follows. Locating a street address, often called the A2 line, is more complicated than locating postal codes, state names and city names because the A2 line may contain a wider range of formats and tokens. In one embodiment, the process of identifying a street address is broken into two steps: classifying text and checking the classified text against address patterns.

First, address extractor 14 classifies a given number of tokens and intervening delimiters to the left of the city name. Rarely does an A2 line contain more than seven or eight discrete tokens, so it is unnecessary to examine more than this number of tokens. One possible token classification scheme might include the following types: street suffix; digits; directional (North, South, East, West, Northeast, Northwest, Southeast, Southwest and abbreviations); rural route or post office box components (e.g., P.O. Box, RR, HC, or HCR); secondary unit designators, such as Suite or Floor; mixed alphanumeric; special street names, such as Broadway; unclassified.

Address extractor 14 also classifies the delimiters between the tokens because it is important to differentiate between word delimiters (typically one or more spaces) and stronger delimiters, such as commas and newline characters. Some delimiters, such as hyphens, can be part of the address.

As part of token delimiter classification, address extractor 14 maintains information about the occurrence of token types within the text that is examined to locate the A2 line. For example, the position (relative to other tokens and delimiters) of the rightmost street suffix, leftmost number, and leftmost strong delimiter, among others, are used in the pattern matching phase.

Once the A2 tokens are classified, address extractor 14 compares them against possible A2 patterns. If fast execution time is a requirement, pattern tests should be executed such that early patterns are both common and computationally cheap. Patterns that successfully match potential A2 lines have a filtering effect, obviating the need to execute subsequent pattern checks. Likewise, it is best to defer checking expensive patterns until more straightforward patterns have had a chance to reduce the number of potential A2 lines executed against the expensive patterns.

To give the flavor of how A2 patterns are used, several patterns are described below. The list is not meant to be complete. In the examples below, "strong delimiter" refers to a delimiter that functions as a separator between logical units of text. Because users don't always use standardized formats when writing addresses, and because formatting languages (such as HTML) often cause formatted text to appear differently than the source text used to specify the formatting, it may not be possible to assign an unambiguous meaning to a specific delimiter. Nevertheless, some delimiters frequently represent a logical partitioning of the text surrounding it. Below, tokens and delimiters are separated from adjacent tokens and delimiters by the "|" character. "DNC" means "do not care". For example, the pattern:

strong delimiter | number | DNC | street suffix.

An example of this pattern is: 36 Elm Street

Another common pattern is as follows:

strong delimiter | one or more tokens | street suffix

This pattern, a common one, may be expressed procedurally. First, address extractor 14 finds the rightmost street suffix. Then, address extractor 14 moves left until a token that is not a street suffix is encountered (some street addresses have two adjacent street suffixes). Address extractor 14 moves left until a token that is a number is encountered. If there are number tokens to the left of this number token, address extractor 14 determines if they are part of the address. In one embodiment, address extractor 14 determines this by checking the delimiter to the left of this number. It may be necessary to check for additional number tokens to find the complete address if the street number is hyphenated, fractional, or if it has an embedded period.

Consider an address of the form "2334 4th Street", which is sometimes expressed as "2334 4 Street." The pattern described here will match addresses of this form. Also note that this pattern could be used to match addresses matched by the first pattern. Since the first pattern is both common and computationally cheaper than the current pattern, if both patterns are used, by applying the first pattern before this pattern, some efficiency is gained.

In one embodiment, the extraction of address information from a document is made easier through the use of special tags that indicate to address extractor 14 that address information follows. For instance, "geotags" are metadata that may be used in web pages and other documents to specify an address or other geographical data (initially points; eventually, perhaps, lines and regions as well). The address may comprise one or more coordinate values, such as, for example, the latitude and longitude values. That is, the tag or tags are used to indicate a longitude and/or a latitude follows.

In an alternate embodiment, address extractor 14 may extract other information from the document that may be indicative of address information. For example, in one embodiment, address extractor 14 may extract a telephone number. Then a table storing address information for that telephone number, or portion thereof (e.g., area code), may be accessed to obtain the address information. The address information in the table could be a postal code and/or state or may be coordinate values (e.g., latitude and longitude). In another embodiment, the table may specify point or area keys. Again, the extraction of the information from the document may be based on the tokens, delimiters and/or tags used the document.

Once a potential address is found it needs to be geocoded. Geocoding refers to the process of assigning a latitude and longitude to the address. In one embodiment, a confidence factor is assigned to each address component as the address is extracted. If the geocoding process indicates that it assigned a precise point in two-dimensional space to the address, geocoding for the address is finished. If the geocoding process indicates that there is room for improvement, one might optionally decide to do further processing in hopes of improving the geocoding accuracy. By examining the confidence factors associated with different parts of the address, it can be determined where additional effort might profitably be spent to improve the geocoding results.

Key Generation

In one embodiment, the key corresponding to the spatial information comprises a quad key. The quad key may be generated from geographic coordinates. In a computer mapping application, coordinates are represented as integers of some resolution. For example, these may be 16-bit unsigned integers. If the integers of coordinates, such as coordinate x and coordinate y, are expressed in binary form, with the bits interleaved (most significant bit (MSB) from x, followed by MSB from y, followed by next-MSB from x, next-MSB from y, etc.), then the relationship between coordinates and quad keys is illuminated and a base-4 quad key emerges.

The MSB from x divides the spatial domain (root quad) in half along the x axis. The MSB from y does the same along the y axis. The four possible combinations map onto the four quadrants mentioned above. The next two interleaved bits from x and y, in identical fashion, subdivide the quad defined by the previous bits, and so on, until the last bits are interleaved, yielding a quad key of maximal precision given the resolution of the source coordinates. This full resolution quad key is also called a point key in recognition of the fact that it can be mapped back to the source coordinates with greater precision than a quad key of lesser resolution.

Figure 2:
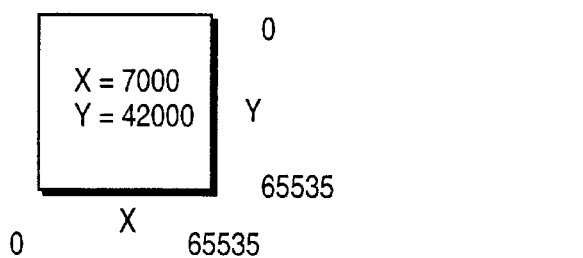
FIG. 2 illustrates one way of deriving a point key.

FIG. 2 shows one technique for deriving a point key. For a particular point, a longitude and latitude exists. By placing the relevant area within a square having x and y coordinates, the longitude and latitude can be converted into coordinates in x and y. In this instance, the x and y coordinates can each be represented by a 16-bit binary value. In this exemplary case, x=7,000 and y=42,000. Taking the binary representation of each coordinate and interleaving those binary values yields a 32-bit binary value, shown as I in FIG. 2. A textual key or quad key, in this case, is q followed by a conversion of adjacent pairs of bits in the interleaved value to decimal. That is, the pairs of bits grouped from left to right in the interleaved binary values are converted to decimal. Thus, in the exemplary case, the quad key is Q10122122202032000.

Using a language like C which permits bit manipulation, it is an easy and efficient matter to compute a point key. Depending on the implementation, this may be stored as a binary value or in textual form. The former is compact. The latter allows the application to take advantage, at search time, of the hierarchical relationship between a textual representation of a point key and a textual representation of an area key (one in which the area key is a leading substring of the point key).

Use of this tiling space method is not restricted to base-2 interleaving. Coordinates represented as base-3 numbers can be used to generate base-9 keys, base-4 to base-16, etc. It should also be noted that other techniques for generating a key or other location indication instead of the point key may be used.

In one embodiment, once generated, the point key is included in the index, along with the other indexed terms and metatags, to permit searching. As discussed above, one or more point keys may be assigned to any web page containing one or more recognizable addresses.

In another embodiment, the point key (possibly along with the address, url, title, and other data) is stored in the static (non-searchable) portion of the index for retrieval after the specific document is identified. The indexed terms and metatags, along with area keys, are included in the index for searching.

An area key is any quad key and is shorter than a point key, thereby representing a larger area. During index time, area keys are generated by address extractor 14. An area key represents an area, on the surface of the earth, in which resides the point represented by the corresponding point key. In one embodiment, the point key is a text string, and its corresponding area keys are leading substrings of the point key.

areakey=substr(point key, 1, desiredlength) It represents an area larger than the point key, but one in which the point key resides. For example, consider the quad key Q101221220203200 to be a point key. For example, the above point resides in Q1012.

In this embodiment, area keys of various lengths are stored for use at search time. Each area key assigned represents a square region of space. The size of the region can be determined by the length of the area key. In essence, given a search center and a radius, a set of area keys representing areas which will tile the circle, will be added to the search criteria to geographically restrict the search.

In one embodiment, area keys of between length 15 (~1.52 miles height) and length 7 (~388.39 miles height) are stored and may be sufficient for many applications.

Query Time Operation

Again referring to FIG. 1, in query time, the user enters a query. The query may be specified using a web interface page 22. The query may include a criterion which may be, for example, a type of business, location, point of interest, etc., for which the user wishes to search, a spatial origin reference, such as an address (or address information or other information indicative of an address), and a distance or radius around that address within which to perform a proximity search. These search terms, acting as limitations, are passed over web 10 to query processor 24.

Processor 24 determines whether address information has been passed in the query and forwards the address and distance to an area key producer 26. This determination may be performed by examining tags in the information that is sent.

Area key producer 26 generates a set of one or more area keys corresponding to a predetermined region (e.g., circle of the radius distance) around the address. The predetermined region may be any shape. Production of the set of area keys will be discussed in greater detail below. The area keys are returned to query processor 24, which uses the area keys and criterion to perform a search in database 20.

In one embodiment, the search performed by query processor 24 attempts to (exactly) match the area key with one of the area keys generated and stored in the database at index time. In another embodiment, the query processor 24 attempts using a wildcard search to match the area key with one of the point keys generated and stored in the database at index time. The former embodiment is preferred to the latter in cases where wildcard searches incur excessive overhead.

The search may result in a return of one or more URLs, resource locators, descriptors and/or possibly, address lists corresponding to the area keys and criterion used in the search. These are then forwarded back over the web 10 to the user at the web interface page 22. The user may then select one of the URLs or the other resource locators to gain access to the resource.

As an example, assume a user inserts "bed & breakfast" as the criterion, uses a partial address of Monterey, Calif., and a distance of 50 miles. The area key producer 26 may first generate a point (textual) key for the partial address "Monterey, Calif." Inasmuch as no complete street address has been specified, the area key producer may select an arbitrary point within Monterey, Calif., or, for example, choose the location of the town's center and generate a corresponding point key. Based on this point key, area keys will be produced for a set of area keys that cover a 50 mile radius circle surrounding that point key. Alternatively, an area key that includes Monterey within its area may be used as the key. The selection of area keys is likely to result in a slightly overinclusive set when the predetermined region is a circle, because each area key corresponds to a square area. This may always occur where the shapes of the predetermined region specified for the search is different than the shape of the region defined by the area keys. A tradeoff exists between closely matching the circle by choosing a large set of small areas or being more overinclusive but having fewer area keys to sort. Note that regions of other shapes (e.g., square, rectangle, triangle, etc.) may be used instead of a circle. Again, the selection of area keys may result in an overinclusive set.

Figure 3:
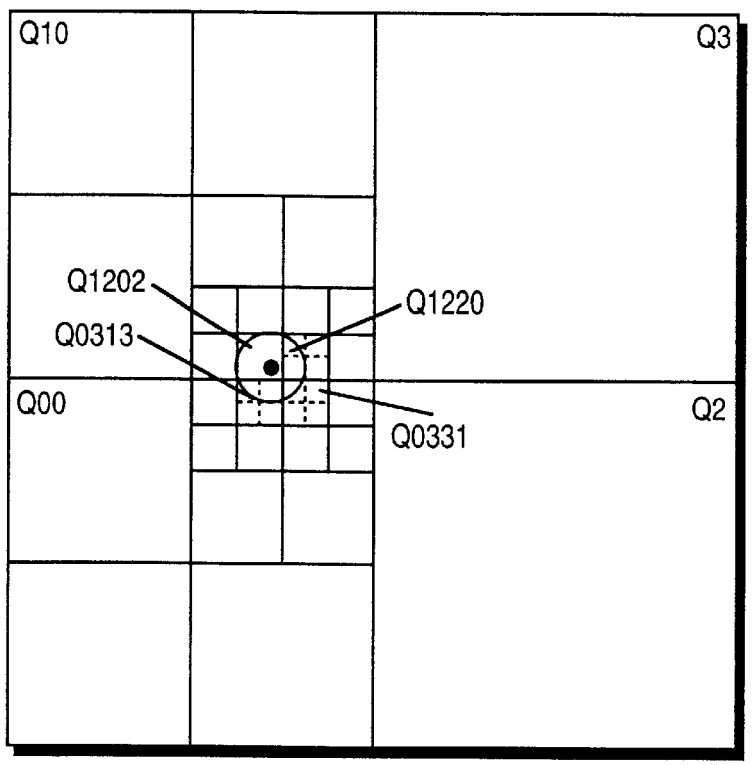
FIG. 3 illustrates exemplary area keys selection.

FIG. 3 shows area keys selection in one embodiment of the invention. An origin point with a fifty mile radius circle is shown. The quads overlapping, or intersecting, the circle would comprise the set of area keys used in this search. In this case, the set of area keys could be Q0313, Q0331, Q1202, and Q1220. Because a relatively small part of quads Q0331, Q1202, and Q1220 is covered, a better fit may be derived by subdividing those quads and using the set Q0313, Q03310, Q03311, Q12020, Q12022, and Q12200.

In the embodiment described above, the area keys are quad keys with less resolution than the point keys. To generate the relevant area keys that intersect the circle (region of interest), a point key is generated for the spatial origin, which in this example is Monterey, Calif., and a decision is made as to how many area keys are to be used. The number of areas keys used is based on the search region (e.g., the search radius). Note that a certain depth of quad key represents a certain distance. For example, a quad key of 1 digit (having a depth of 1) represents 13,000 miles (or ¼ of the world when separated into quads), and a quad key of 2 digits represents ½ of 13,000. Based on the distance desired, such as fifty miles in the example above, the depth of quad keys may be selected to cover the search area. This is same depth for the area keys.

In the case of quad keys, four area keys at the same level having a common depth may be combined into a single area key where they share the same parent. If less than four search area keys are combined into a single area key, then the area covered by the single area key may be greater than the distance indicated by the user when specifying the region to be searched.

Again referring to FIG. 1, the area keys are then forwarded to the query processor 24 which uses "bed & breakfast" and the set of area keys as terms for indexing into database 20. The result is that identifiers, such as URLs, possibly some description, and/or an address list corresponding to a set of documents including the term "bed & breakfast" and one or more addresses within the fifty mile radius of Monterey, Calif. are returned. The set of bed & breakfasts may be proximity ordered. Furthermore, those outside the search radius can be culled out. Significantly, such a proximity search will identify bed & breakfasts that are not in Monterey, but rather have addresses in surrounding towns. It is also within the scope and contemplation of the invention to provide a limitation on a number of hits returned. For example, if this option is provided, a user might specify that only twenty-five hits are to be returned. While there are more than likely more than twenty-five bed & breakfasts within fifty miles of Monterey, such a search would only return the twenty-five closest to the specified point key.

Figure 4:
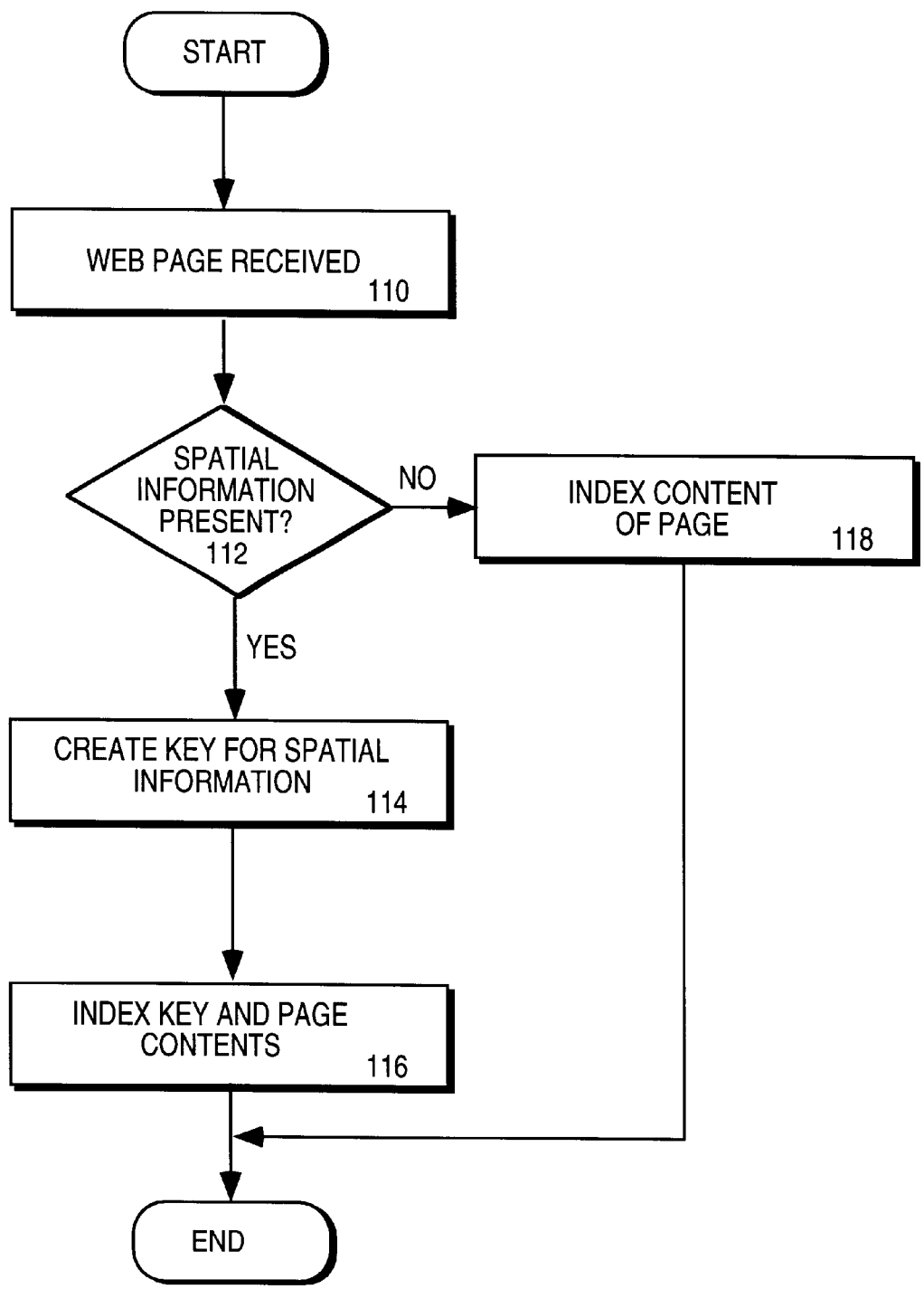
FIG. 4 is a flow chart of one embodiment of the process for generating searchable text during index time.

FIG. 4 is a flow chart of operation of one embodiment of the invention during index time. A Web page is received at functional block 110. At decision block 112, a decision is made as spatial information is present in the Web page. If there is spatial information at decision block 112, point keys corresponding to the spatial information and appropriate area keys are created at functional block 114. Then, at functional block 116, the area keys and page contents are indexed in a single index. At functional block 118, the point key(s) and address(es) are saved in a static (non-scaleable) portion of the index. If, at decision block 112, no spatial information can be identified on the page, the content of the page is indexed in the usual manner at functional block 118.

Figure 5:
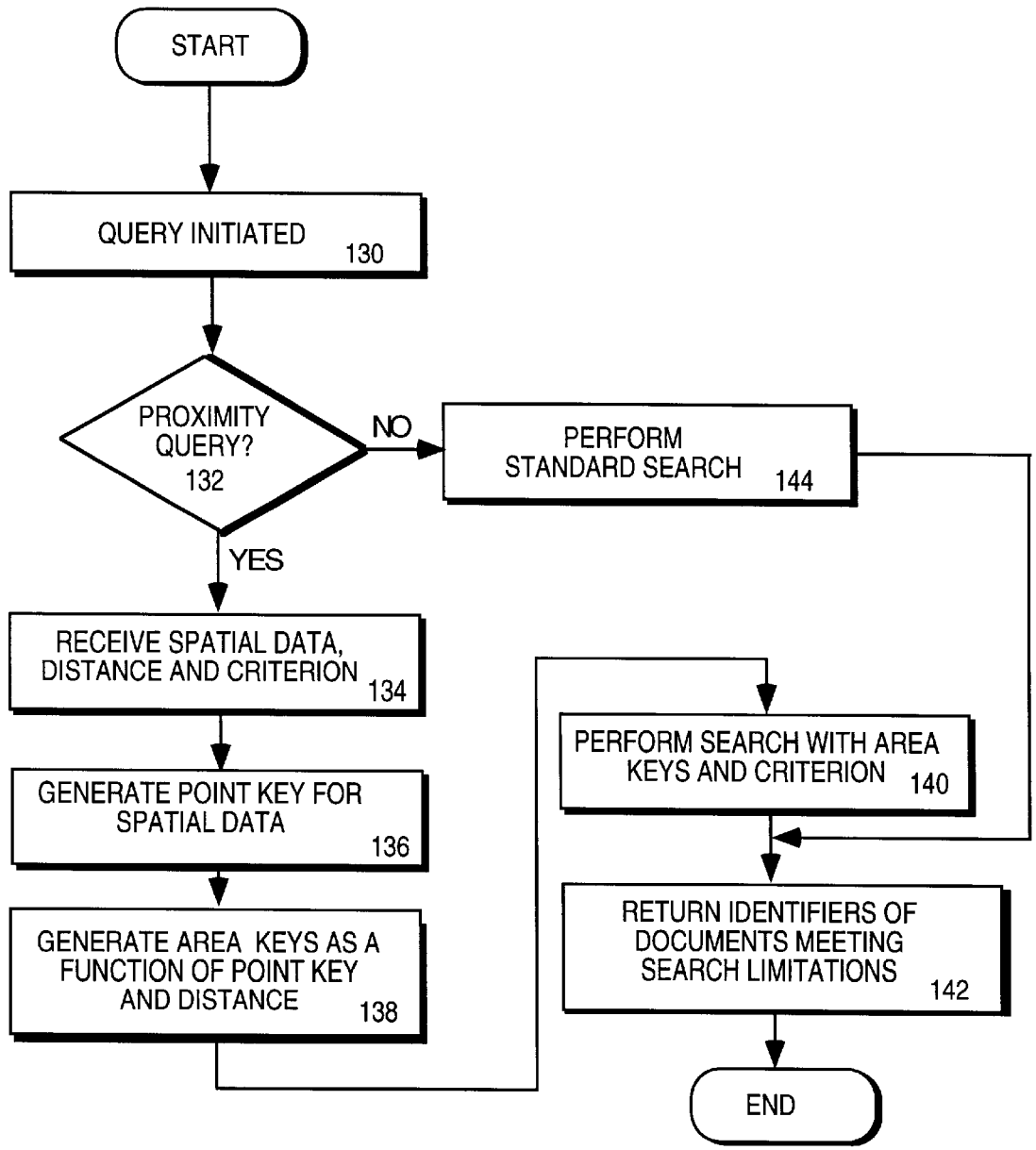
FIG. 5 is a flow chart of one embodiment of the process for performing a query.

FIG. 5 is a flow chart of query time operation of one embodiment of the invention. The user initiates a query at functional block 130. A determination is made at decision block 132 if a proximity query has been initiated. If it is a proximity query, at functional block 134, spatial data and a distance is received from the user. At functional block 136, a point key for the spatial data is generated. Based on the point key, the system generates area keys covering the user specified distance, at functional block 138. Next a search is performed in an index to identify those locations within the area specified satisfying the criterion and having matching area keys at function block 140. The identifier (e.g., URLs, document IDS, etc.) of documents meeting the search limitation are returned at functional block 142. If at decision block 142, the query is determined not to be a proximity query, the search is performed in a standard manner at functional block 144.

Generating Area Keys at Search Time

In one embodiment, to do a proximity-based search, the search criteria is modified by specifying that the any documents must have had one of a set of area keys saved for them at index time. That set of area keys represent the areas that fully tile (and overlap) the predetermined region (e.g., circle) defined by the search center (and the radius).

One embodiment of a process to find the set of area keys that overlap that circle includes the following operations performed by the area key generator.

First, the area key generator converts center coordinates and the radius to the same units, if not already expressed as such. Then, area key generator chooses a length for the area keys to be returned. This number can be table driven based on the radius desired. The larger the radius, the shorter the desired area key length.

Next, area key generator calculates a bounding box around the circle.

xradius=radius/cos(lat);

yradius=radius;

bounds->botLeft.x=center->x−xradius;

bounds->topRight.x=center->x+xradius;

bounds->botLeft.y=center->y−yradius;

bounds->topRight.y=center->y+yradius;

After calculating the bounding box, the area key generator calculates the smaller size of the area represented by any of the area keys to be generated.

Once the size of the area has been calculated, the area key generator, in a set of nested loops, traverses the bounding box from the lower left of the bounding box, to the upper right of the bounding box. For each potential area key, the area key calculates the distance from the center to the area represented by that potential area key (at the point closest to the center). If the distance is less than, or equal to, the desired radius, add the area key to the list, converting the (x,y) coordinate to an area key.

Note the use of the cos(lat) to account for the fact that area keys become narrower as they approach the poles.

dy=MIN(MAX(center->y, thisQuad.y), thisQuad.y+grid.quadSize.y−1)-center0>y:

dx=(MIN(MAX(center->x, thisQuad.x), thisQuad.x+grid.quadSize.x−1)-center->x)*cos(lat);

distance=sqrt((dx*dx)+(dy*dy));

At this point, it is desirable for performance reasons (though not technically necessary) to sort the resulting list and reduce any adjacent area keys that fully tile their parent to that parent. For example (given base-4 area keys) if the keys Q0123220, Q0123221, Q0123222, and Q0123223 all exist in the list, they can be reduce to Q012322.

Much data on the web exists in databases and is only accessible as a result of procedural logic that dynamically creates responses to user queries. Dynamic data is typically not searched by web search engines. Dynamic data sources often have spatial information. One such example is the Electronic Yellow Pages (EYP). It is possible to use the techniques described herein to combine searches of static and dynamic data.

Assume that is desired to search the Electronic Yellow Pages as well as static web pages. In one embodiment, a special type of document is created that includes a list of keywords and phrases that correspond to a specific EYP category, such as automobile dealers. At search time, indexes for the special documents are searched along with the standard index for static web pages. A dynamically created URL is returned for each special document, and hence EYP category, that matches the search terms supplied by the user within the geographic area specified by the user. The dynamic URL contains enough information to trigger a fully qualified EYP search for the categories and location specified by the user. Just as with a static URL, the user can click on the dynamic URL. In the former case, the static web page is returned to the user. In the latter case, the results of parameterized EYP search are returned. Alternatively the EYP search can be automatically executed on behalf of the user.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a spatial search performed as part of a free text search has been described.

We claim:

1. A method for generating searchable information comprising:
    scanning a document;
    determining whether any portion of the document being scanned contains information indicative of a spatial datum;
    finding a document portion that contains the information indicative of the spatial datum;
    examining data surrounding the document portion to locate the spatial datum in the document;
    extracting to spatial datum from the document;
    geocoding the spatial datum by generating a point key from a latitude and longitude, wherein generating the point key comprises:
        interleaving bits of the latitude with bits of the longitude; and
        converting adjacent pairs of bits to a number, the point key comprising an N-bit binary number that corresponds with the spatial datum; and
    generating area keys, each area key comprising an area greater than an area defined by the point key but which includes the area defined by the point key.

2. The method defined in claim 1 further comprising indexing the geocode for the spatial datum.

3. The method defined in claim 1 wherein the document comprises a Web page.

4. The method defined in claim 1 wherein the spatial datum comprises information indicative of an address.

5. The method defined in claim 4 wherein the address comprises a postal address.

6. The method defined in claim 4 wherein the information comprises a postal code.

7. The method defined in claim 4 wherein the information comprises a telephone number.

8. The method defined in claim 1 further comprising spidering the document to extract the spatial datum.

9. The method of claim 1 further comprising extracting the spatial datum by identifying a tag located in the document indicating the presence of the spatial datum.

10. An apparatus for generating searchable information comprising:
    means for scanning a document;
    means for determining whether any portion of the document being scanned contains information indicative of a spatial datum;
    means for finding a document portion containing the information indicative of the spatial datum;
    means for examining data surrounding the document portion to locate the spatial datum in the document;
    means for extracting the spatial datum from the document;
    means for geocoding the spatial datum by generating a point key from a latitude and longitude, wherein generating the point key comprises:
        interleaving bits of the latitude with bits of the longitude; and
        converting adjacent pairs of bits to a number, the point key comprising an N-bit binary number that corresponds with the spatial datum; and
    means for generating a set of area keys to perform geographical searches, each area key comprising an area greater than an area defined by the point key but which includes the area defined by the point key.

11. The apparatus defined in claim 10 further comprising means for recognizing the spatial datum.

12. The apparatus defined in claim 10 wherein the set of area keys are generated at query time.

13. The apparatus defined in claim 10 further comprising means for indexing the geocode for the spatial datum.

14. The apparatus defined in claim 10 wherein the document comprises a Web page.

15. The apparatus defined in claim 10 wherein the spatial datum comprises information indicative of an address.

16. The apparatus defined in claim 15 wherein the address comprises a postal address.

17. The apparatus defined in claim 15 wherein the information comprises a postal code.

18. The apparatus defined in claim 15 wherein the information comprises a telephone number.

19. The apparatus defined in claim 10 further comprising spidering the document to extract the spatial datum.

20. The apparatus defined in claim 10 further comprising extracting the spatial datum by identifying a tag located in the document indicating the presence of the spatial datum.

21. A method for facilitating a search comprising:
    receiving a user request for a proximity search of one or more objects, the user request including a spatial location and a distance from the spatial location, wherein the spatial location and the distance from the spatial location correspond to a desired search area;
    in response to the user request, generating a point key of the spatial location;
    defining the desired search area by covering an area around the point key from a latitude and longitude, wherein generating the point key comprises:
        interleaving bits of the latitude with bits of the longitude; and
        converting adjacent pairs of bits to a number, the point key comprising an N-bit binary number that corresponds with the spatial location based on the distance from the spatial location;
    determining a set of area keys intersecting the desired search area, each area key comprising an area greater than an area defined by the point key but which includes the area defined by the point key; and
    searching a database for one or more records that have keys matching any one of the set of area keys.

22. The method defined in claim 21 wherein the information indicative of a spatial location comprises an address.

23. The method defined in claim) 21 wherein the information indicative of a spatial location comprises a latitude and a longitude.

24. The method defined in claim 21 wherein information indicative of a spatial location comprises a specified location on a user specified region of a map.

25. The method defined in claim 21 wherein receiving the user request comprises receiving a selection from a pop-up menu.

26. The method defined in claim 21 wherein the predetermined region comprises a circle having a radius of the distance.

27. The method of claim 21 further comprising returning identifiers for a set of documents satisfying a criterion and containing an address within the desired search area.

28. The method defined in claim 27 wherein the identifiers comprise resource locators.

29. The method defined in claim 28 wherein the resource locators comprise URLs.

30. The method defined in claim 27 wherein the documents comprise Web pages.

31. The method defined in claim 21 further comprising:
    searching the database with the set of area keys to locate records in the database that each include a matching point key; and
    identifying a matching record as one in which at least one of the area keys match a stored area key.

32. The method defined in claim 21 further comprising:
    searching the database with the set of area keys and a predetermined criteria to locate records in the database; and
    identifying a matching record as one in which at least one of the area keys partially matches a point key for the record and also matches the predetermined criteria.

33. The method defined in claim 32 wherein the predetermined criteria comprises one or more keywords.

34. The method defined in claim 32 wherein the predetermined criteria comprises spatial criteria.

35. A system comprising:
    an address extractor to scan an arbitrary document, to determine whether any portion of the document being scanned contains information indicative of spatial data, to find a document portion that contains the information indicative of the spatial data, to examine data surrounding the document portion to locate the spatial data in the document, and to automatically extract the spatial data from the arbitrary document;
    a point key generator to generate a point key from a latitude and longitude, the point key comprising an N-bit binary number corresponding to the spatial data in response to extraction of the spatial data, wherein the point key generator generates the point key by interleaving bits of the latitude with bits of the longitude and converting adjacent pairs of bits to a number; and
    an area key producer to create a set of area keys responsive to a query specifying an origin and a distance, each area key comprising an area greater than an area defined by a respective point key but which includes the area defined by a respective point key.

36. The system of claim 35 further comprising a database storing an index of keys corresponding to an arbitrarily large set of spatial data.

37. The system of claim 35 further comprising a processor to search the index based on the set of area keys and a user supplied criterion.

38. A method of spatially locating a document comprising:
    receiving a user request for a proximity search of one or more objects, the user request including information indicative of an address of a spatial location and a selected distance from the spatial location, wherein the spatial location and the selected distance from the spatial location correspond to a desired search area;
    in response to the user request, generating a first key indicative of the spatial location from a latitude and longitude, the first key comprising an N-bit binary number corresponding to the spatial location, wherein generating the first key comprises:
    interleaving bits of the latitude with bits of the longitude; and
    converting adjacent pairs of bits to a number;
    generating a second key intersecting the desired search area around the first key corresponding to the selected distance from the spatial location, the second key comprising an area greater than an area defined by the first key but which includes the area defined by the first key; and
    performing a text search of a plurality of records using the second key.

39. The method defined in claim 38 wherein the size of the second key is determined based on the selected distance from the spatial location.

* * * * *

UNITED STATES PATENT AND TRADEMARK OFFICE
CERTIFICATE OF CORRECTION

PATENT NO. : 6,701,307 B2
DATED : March 2, 2004
INVENTOR(S) : Martin Himmelstein It is certified that error appears in the above-identified patent and that said Letters Patent is hereby corrected as shown below:

Column 12,
Line 35, after "center" delete "0>y:" and insert -- ->y; --, therefore.

Column 13,
Line 26, delete "to" and insert -- the --, therefore.

Column 14,
Line 59, after "claim" delete ")".

Column 15,
Line 28, delete "mare" and insert -- more --, therefore.

Signed and Sealed this

Fifth Day of July, 2005

JON W. DUDAS
*Director of the United States Patent and Trademark Office*